US010722987B2

(12) United States Patent
Lloyd

(10) Patent No.: US 10,722,987 B2
(45) Date of Patent: Jul. 28, 2020

(54) JOINING MACHINES WITH A POSITION GUIDE SYSTEM

(71) Applicant: FORD GLOBAL TECHNOLOGIES, LLC, Dearborn, MI (US)

(72) Inventor: Matthew Lloyd, Point Cook (AU)

(73) Assignee: Ford Global Technologies LLC, Dearborn, MI (US)

( * ) Notice: Subject to any disclaimer, the term of this patent is extended or adjusted under 35 U.S.C. 154(b) by 158 days.

(21) Appl. No.: 15/693,883

(22) Filed: Sep. 1, 2017

(65) Prior Publication Data
US 2018/0085863 A1    Mar. 29, 2018

(30) Foreign Application Priority Data

Sep. 29, 2016    (CN) .......................... 2016 1 0867253

(51) Int. Cl.
B23K 37/04    (2006.01)
B23K 11/28    (2006.01)
B21J 15/10    (2006.01)
B21J 15/28    (2006.01)
B23K 11/36    (2006.01)
B21J 15/02    (2006.01)
B23K 11/11    (2006.01)

(52) U.S. Cl.
CPC .............. *B23K 37/04* (2013.01); *B21J 15/025* (2013.01); *B21J 15/10* (2013.01); *B21J 15/105* (2013.01); *B21J 15/28* (2013.01); *B23K 11/115* (2013.01); *B23K 11/28* (2013.01); *B23K 11/36* (2013.01)

(58) Field of Classification Search
CPC ....... B23K 11/115; B23K 11/28; B23K 37/04; B21J 15/025; B21J 15/105; B21J 15/28; F21W 2131/402; F21W 2131/403; Y10T 83/828; B23Q 15/22
USPC ......................................................... 700/212
See application file for complete search history.

(56) References Cited

U.S. PATENT DOCUMENTS

| 9,269,279 | B2 | 2/2016 | Penrod et al. | |
| 2006/0016957 | A1* | 1/2006 | Hofmann | B28D 1/043 250/201.1 |
| 2007/0075048 | A1 | 4/2007 | Kunisaki et al. | |
| 2010/0017012 | A1* | 1/2010 | Benayad-Cherif | B23K 26/03 700/182 |
| 2011/0147355 | A1* | 6/2011 | Miwa | B23K 11/115 219/136 |
| 2013/0203511 | A1* | 8/2013 | Behan | B21J 15/14 470/1 |

(Continued)

FOREIGN PATENT DOCUMENTS

EP    2036648 A1    3/2009
JP    07302825 A  *  11/1995  .............  H01L 24/78
(Continued)

Primary Examiner — Geoffrey S Evans
(74) Attorney, Agent, or Firm — Vincent Mastrogiacomo; Kolitch Romano LLP

(57) ABSTRACT

A joining machine to join work-pieces together comprises a body, at least one scanner disposed on the body and configured to collect data on the work-pieces and convert the data to a scanned image, a guide device and a positioning device. The positioning device is configured to determine a join position according to the scanned image and instruct the guide device to indicate the join position on the work-pieces to an operator of the machine.

15 Claims, 6 Drawing Sheets

(56) References Cited

U.S. PATENT DOCUMENTS

| | | | | |
|---|---|---|---|---|
| 2013/0286187 A1* | 10/2013 | Slesinski | ............ | B25B 21/00 |
| | | | | 348/94 |
| 2014/0259600 A1* | 9/2014 | Kilibarda | ............ | G01N 21/84 |
| | | | | 29/407.04 |
| 2014/0325810 A1* | 11/2014 | Schneider | ............ | B21J 15/02 |
| | | | | 29/407.04 |
| 2016/0031110 A1* | 2/2016 | Middleton | ............ | B26D 5/007 |
| | | | | 83/13 |

FOREIGN PATENT DOCUMENTS

| | | |
|---|---|---|
| JP | P2005334914 A | 12/2005 |
| JP | P2006320950 A | 11/2006 |
| WO | 2012016851 A1 | 2/2012 |

* cited by examiner

JOINING MACHINES WITH A POSITION GUIDE SYSTEM

RELATED APPLICATION

This application claims the benefit of Chinese Patent Application No. CN 201610867253.8 filed on Sep. 29, 2016, the entire contents thereof being incorporated herein by reference.

FIELD

The present disclosure relates to a manually operated joining machine with a guiding system to aid locating a spot weld.

BACKGROUND

The manufacturing industry uses various methods to join materials together. For example, spot welding is typically used to weld sheet metal, wire mesh and other metal parts. In a resistance spot welding process, two electrodes are used to concentrate welding current into a small spot and to simultaneously clamp the work-piece together. Applying a current through the spot will melt the metal and form the weld. Contacting metal surfaces are joined by the heat obtained from resistance to electric current. Spot welding involves three stages: to bring the electrodes into contact with the surface of work-piece and applying a slight amount of pressure, applying the current from the electrodes to the spot, and remaining the electrodes in place to allow the material to cool and solidify.

Another example is a self-piece riveting which is a high-speed mechanical fastening process for point joining similar materials such as sheet material or a material combination. The self-piecing riveting generally uses a semi-tubular rivet to clinch the sheets in a mechanical joint. The process starts by clamping the sheets between the die and the blank holder. The rivet is driven into the sheets to be joined between a punch and die in a press tool by a self-piecing riveting machine. The rivet pierces the top sheet and the die shape causes the rivet to flare within the lower sheet to form a mechanical interlock. Similarly, self-threading/piecing screws or self-threading/piecing bolts processing joins the pieces together at join points. Yet another example is an adhesive gun that applies adhesive to join material together.

The processes described above can be manually performed by an operator using a machine or a gun. The inventor has recognized that locating a join position may become an issue. For example, the operator may work continuously on multiple join positions at pieces and may need to walk along the pieces to be joined (e.g., an assembly line). Consequently, the operator may have difficulty aiming the spot welding gun at the correct positions due to the operator's movement and fatigue from using the heavy machine. As such, repeatability on the join position for work-pieces and quality of the pieces being joined suffer. There exists a need for a joining machine that provides a guide to the operator to locate the join positions in the pieces.

SUMMARY

According to one aspect, a joining machine to join work-pieces together is provided. The machine comprises a body; at least one scanner disposed on the body and configured to collect data on the work-pieces and convert to the data to a scanned image; a guide device; and a positioning device. The positioning device is configured to determine a join position according to the scanned image and instruct the guide device to indicate the join position on the work-pieces to an operator of the machine.

In one embodiment, the positioning device may be further configured to include a preloaded profile model of the work-pieces and determine the join position by comparing the scanned image with the preloaded profile model.

In another embodiment, the scanner may be a 3D scanner and the scanned image may be a 3D image, and the preloaded profile model may be a CAD model.

In another embodiment, the positioning device may be configured to include a preloaded profile model of the work-pieces and the join position may be determined by overlaying the scanned image with the preloaded profile model.

In another embodiment, the guide device may be a light projector, and a light may be projected to the work-pieces to indicate the join position when the tip approaches a first predetermined distance from the pieces.

In another embodiment, the light projected may be a laser or a visible light, and a green light may be turned on when the tip is placed substantially near the join position.

In another embodiment, the machine may further comprise an audio unit and the positioning device may be further configured to identify a position of the tip, and the audio unit makes a confirmation sound when the tip is placed substantially near the join position.

In another embodiment, the light projector may be configured to stop projecting the light on the pieces when the tip is moved within a second predetermined distance to the work-pieces, and the second predetermined distance may be less than the first predetermined distance.

In another embodiment, the guide device may include a display screen attached to the body and the join position is indicated on the display screen to guide the operator in placing the tip on the pieces.

In another embodiment, the positioning device may be configured to store data of actual join positions at which the work-pieces are joined by the force along with corresponding data in the preloaded profile model for quality control.

In another embodiment, the machine is a spot welding gun.

In another embodiment, the machine is a self-piece riveting gun, a self-pierce screw gun, a self-pierce bolt gun, or an adhesive gun.

According to another aspect, a joining machine to join work-pieces at join positions comprises a tip to apply a force to the pieces; a body including a first side and a second side opposite the first side; a first 3D scanner disposed on the body and configured to collect data on a surface of the work-pieces and convert the data into a scanned CAD image; a guide device disposed on the body and configured to indicate a join position on the work-pieces to an operator of the machine; and a positioning device configured to determine the join position according to the scanned CAD model and command the guide device to show the join position to the operator.

In one embodiments, the machine may further comprise a second 3D scanner. The first 3D scanner may be disposed on or adjacent to the first side of the body and the second 3D scanner may be disposed on or adjacent to the second side of the body. The positioning device may be configured to determine the join position by comparing the scanned CAD model with a preloaded CAD model of the pieces.

In another embodiment, the join position may be determined by overlaying the scanned CAD image with the preloaded CAD model; the guiding device may be a light projector that projects a light on the join position when the scanned CAD image is aligned with the preloaded CAD model.

In another embodiment, the guiding device may include a display screen, and the join position and the tip are shown on the display screen to guide the operator place the tip to the join position.

According to another aspect, a method is provided to guide an operator to join work-pieces using a joining machine. The joining machine includes a scanner, a guide device, and a positioning device. The method comprises scanning a surface of work-piece and generating a scanned image; determining a join position according to the scanned image; and indicating the join position to an operator of the joining machine using the guide device.

In one embodiment, the guide device may be a light projector disposed on the joining machine and indicating the join position may include projecting a light point on the join position on the work-piece.

In another embodiment, the guiding device may be a display device disposed on the joining machine, and wherein indicating the join position may include displaying the join position and a tip of the joining machine on a display screen to guide the operator.

In another embodiment, the method may further comprise confirming that a tip of the joining machine is placed at the join position via a confirmation unit.

The joining machine and the method of using the same of the present disclosure is advantageous because they provide visual aid to an operator of the joining machine. The machine can upload profile models for different work-pieces so that the joining machine can be used for different work-pieces and different assembly lines.

BRIEF DESCRIPTION OF THE DRAWINGS

Example embodiments will be more clearly understood from the following brief description taken in conjunction with the accompanying drawings. The accompanying drawings represent non-limiting, example embodiments as described herein.

It should be noted that these figures are intended to illustrate the general characteristics of methods, structure and/or materials utilized in certain example embodiments and to supplement the written description provided below. These drawings are not, however, to scale and may not precisely reflect the precise structural or performance characteristics of any given embodiment, and should not be interpreted as defining or limiting the range of values or properties encompassed by example embodiments. The use of similar or identical reference numbers in the various drawings is intended to indicate the presence of a similar or identical element or feature.

DETAILED DESCRIPTION

The disclosed joining machines will become better understood through review of the following detailed description in conjunction with the figures. The detailed description and figures provide merely examples of the various inventions described herein. Those skilled in the art will understand that the disclosed examples may be varied, modified, and altered without departing from the scope of the inventions described herein. Many variations are contemplated for different applications and design considerations; however, for the sake of brevity, each and every contemplated variation is not individually described in the following detailed description.

Throughout the following detailed description, examples of various joining machines are provided. Related features in the examples may be identical, similar, or dissimilar in different examples. For the sake of brevity, related features will not be redundantly explained in each example. Instead, the use of related feature names will cue the reader that the feature with a related feature name may be similar to the related feature in an example explained previously. Features specific to a given example will be described in that particular example. The reader should understand that a given feature need not be the same or similar to the specific portrayal of a related feature in any given figure or example.

Figure 1:
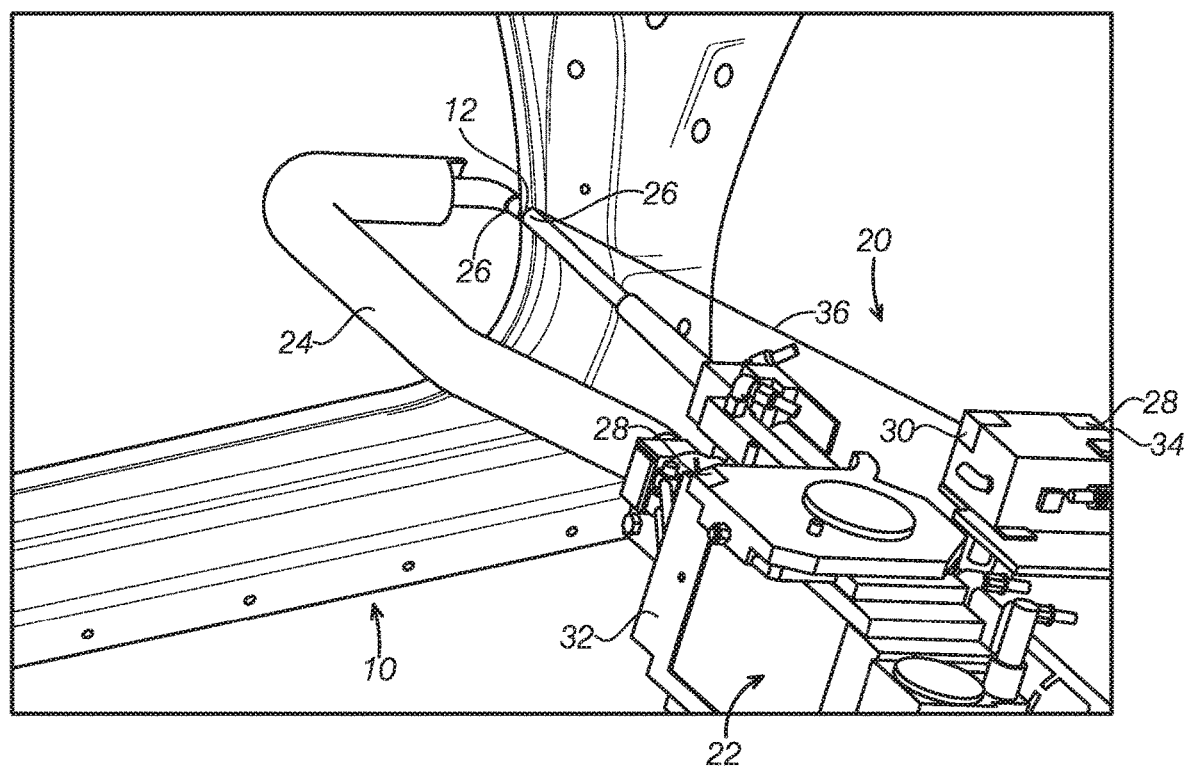
FIG. 1 is a schematic view of an example spot welding gun according to one embodiment of the present disclosure, illustrating the positioning of the spot welding gun on a welding spot of work-pieces.

To simplify the explanation, a spot welding gun is described as an example of a joining machine to illustrate a position guide system according to an embodiment of the present disclosure. It should be appreciated that the position guide system of the present disclosure can be used in any joining machine that needs to find a join position. For example, the joining machine may be a spot welding gun, a self-piece riveting machine, a self-piece screw/bolt machine or an adhesive gun, which are operated by an operator or held by the operator during the joining operation. FIG. 1 is a schematic view of a work-piece 10 and an example spot welding gun 20, illustrating the positioning of the spot welding gun 20 on a join position 12 of the work-piece 10 according to one embodiment of the present disclosure. The spot welding gun 20 may include a body 22, an arm 24 and a tip 26 coupled to the body 22 via the arm 24. In some embodiments, the spot welding gun 20 may involve resistance spot welding and the tips 26 may include electrodes. As illustrated in FIG. 1, the work-piece 10 is held between two electrodes 26 and compressed under pressure. When an electrical current is passed through the electrodes 26, the resistance to the flow of current through the work-piece 10 at the pressure point creates heat to melt the work-piece 10 and form the weld.

The work-piece 10 may include multiple specific join positions or spot welds. An operator has to correctly locate each spot weld so that the work-piece 10 can be joined with another work-piece (not shown) at multiple joint positions to achieve connections with the desired strength. To aid the operator to place the tip 26 of the spot welding gun 20 at a correct position, a position guide system may be included in the spot welding gun 20. In some embodiments, the position guide system may include a scanner 28 to obtain information on a surface of the work-piece 10 and a guide device 30 to assist the operator to locate the spot weld based information from the scanner 28. In some embodiments, the scanner 28 may determine the shape and/or appearance of the work-piece 10. The scanner 28 may analyze the work-piece 10 by collecting data on its shape and/or appearance (e.g., color) and then constructing a scanned image or a model of the work-piece 10 based on the collected data. The scanner 28 may be any scanning device using suitable technologies. For example, the scanner 28 may be a 3D scanner that creates a point cloud of geometric samples on the surface of the work-piece 10. The points can then be used to extrapolate the shape of the work-piece 10. If color information is collected at each point, then the color on the surface of the work-piece 10 can also be determined. The color markings on the work-piece 10 may be used as reference for determining the spot welds. In some embodiments, the scanner 28 may be a non-contact active scanner based on a triangulation mechanism, that is, a laser dot or line is projected onto the work-piece 10 and a sensor measures the distance to the surface. The data may be collected by a computer, recorded as data points within three-dimensional space and converted into a triangulated mesh and then a computer-aided design (CAD) model. In some embodiments, the scanner 28 may be a non-contact passive scanning device using one or two cameras to collect image data, analyze the image data and determine the shape of the work-piece 10. It should be appreciated that the scanner 28 is not limited to the example described above and any suitable scanners that can determine the shape of the weld piece during motion may be used.

In some embodiments, the spot welding gun 20 may include one scanner that can scan the work-piece 10 at a specific field of view. In some embodiments, the spot welding gun 20 may include two scanners 28. In the depicted embodiments, two scanners 28 are disposed on a first side 32 and a second side 34 of the body 22, respectively. The first side 32 is opposite the second side 34. Alternatively, two scanners 28 may be disposed adjacent to the first side 32 and the second side 34, respectively. The field of view of the scanner 28 at the first side 32 may be different from that of the scanner 28 at the second side 34. As such, a view blocked from the line of sight of the scanner 28 at the first side 32 may be captured by the scanner 28 at the second side 34. In this way, the scanners 28 scan the work-piece 10 at different angle and thus complement each other to have a wider field of view. Although one scanner or two scanners may be used in the spot welding gun 20 as described above, it should be appreciated that multiple scanners may be used and positioned at appropriate position of the body of the spot welding gun 20 depending the configuration of the work-piece and a type of scanner to be used. Further, a scanner with a plurality of sensors with a wider field of view may be used.

In the embodiment depicted in FIG. 1, the guide device 30 is a light projector that projects a laser beam 36 or a visible light beam and forms a light point on the pieces. In some embodiments, the light projector 30 may include a light source having a light and a moving mirror which reflects the light into the work-pieces to form a light dot to indicate the spot weld or the join position. The laser may be a green laser, a red laser or any appropriate form of laser. The light may be controlled to be turned on or off by a program in a processor as described in detail in FIG. 2. For example, as the tips 26 of the spot welding gun 20 approach the work-piece 10 at a first predetermined distance, the projector 30 projects a light and forms a light point at the spot weld 12. The first predetermined distance may be the distance at which the positioning device has determined the join position. As the operator moves the gun, the light projector 30 and the scanner 28 are in motion. Because the scanner continually scans the work-piece 10, the program controlling the light projection knows the spot weld despite the movement so that the mirror in the light source maintains a single point for a specific join position. In some embodiments, the light projector may be configured to stop projecting the light on the pieces when the tip is moved within a second predetermined distance to the work-pieces. The second predetermined distance is less than the first predetermined distance. The second predetermined distance may be close to the surface of the work-piece. At the second predetermined distance, the tip of the spot welding gun 20 is being placed at a position substantially near the second predetermined distance, and thus further guidance using the light may not be necessary.

The light point 12 projected on the work-piece 10 becomes a visual aid to the operator so that the operator can place the tips of the spot welding gun 20 correctly. In this way, misplacement of the tips on the spot weld can be reduced and the accuracy of connecting the work-pieces on the designated positions is improved. As such, an operator of the spot welding gun can achieve reliable performance and produce welded parts with greater repeatability and good quality.

In some embodiments, the spot welding gun 20 may include a mechanism to confirm the spot weld. For example, the spot welding gun 20 may include a confirmation unit to indicate that the tip is placed at the correction position. In one embodiment, the spot welding gun 20 may include an audible unit to make confirmation sound when the tip is placed at the correct position. In another example, the spot welding gun may include a lamp that generates green light when the tip is placed at the correct position. The confirmation unit further assist the operator and shorten the time to locate the spot weld by validating the operator's judgement.

Figure 2:
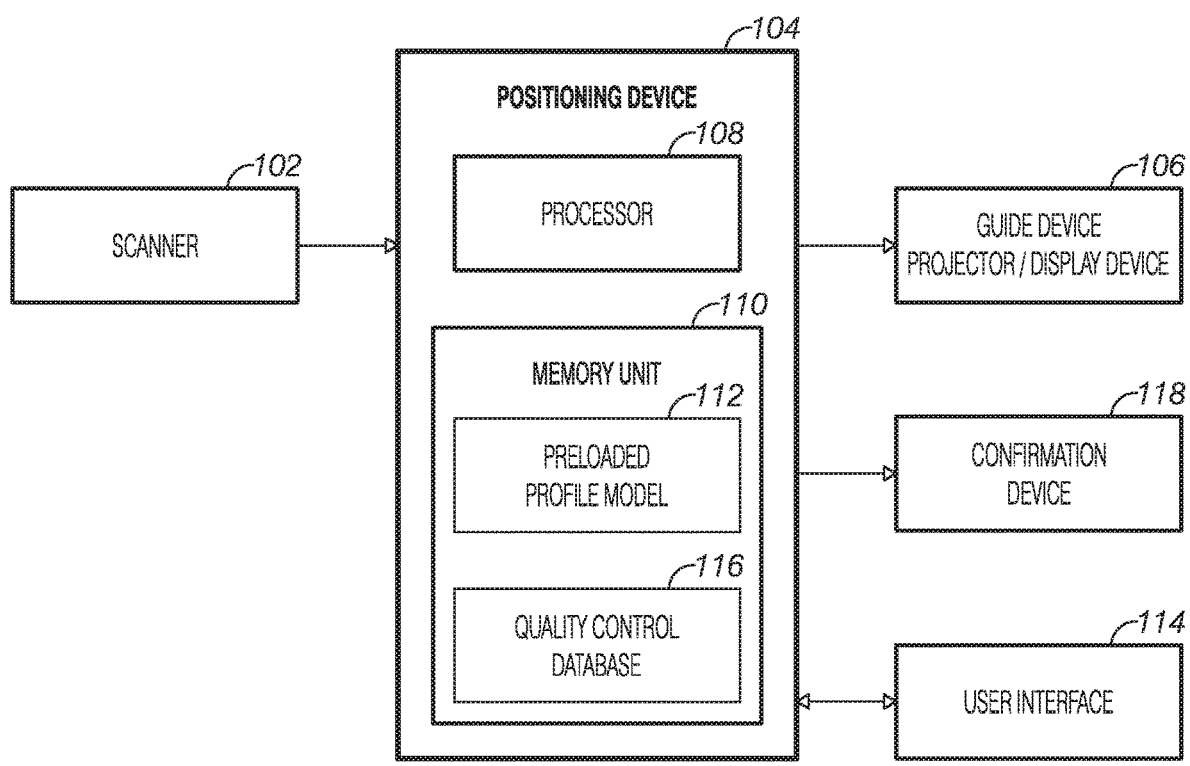
FIG. 2 is a schematic block diagram of a position guide system of a joining machine according to one example embodiment of the present disclosure.

FIG. 2 is a schematic block diagram of a position guide system 100 of a joining machine according to one example embodiment of the present disclosure. The joining machine may be any device that joins the pieces together by joining points on the work-pieces. For example, the joining machine may be a spot welding gun, a self-piece riveting machine, a self-piece screw/bolt machine or an adhesive gun, which are operated by an operator. The position guide system 100 may include a scanner 102, a positioning device 104, and a guide device 106. As described above in FIG. 1, the scanner 102 may be any suitable scanner that determines a shape and/or appearance of the work-piece. The scanner 102 may collect data on a work-piece and covert the collected data into a scanned image or a scanned model recognizable by the positioning device 106. In some embodiments, the scanner 102 may be a 3D scanner and the converted data may be a scanned image or a scanned CAD model. Depending on the configuration of the work-pieces, the position guide system 100 may include one or more scanners so as to collect necessary information on the surface of the work-piece to provide the scanned image for the determination of the join positions.

The positioning device 104 may include a processor 108 that provides for computational resources. The positioning device 104 may serve to execute instructions for software that may be loaded into a memory unit 110. The instructions may include program code, computer-usable program code, or computer-readable program code. The memory unit 110 may be a storage device that is capable of storing information, such as, without limitation, data, program code in functional form, and/or other suitable information on either a temporary basis and/or a permanent basis. For example, the memory unit 110 may include a random access memory or any other suitable volatile or non-volatile storage device and a persistent storage. The persistent storage may be one or more devices such as a hard drive, a flash memory, a rewritable optical disk, a rewritable magnetic tape, or some combination of the above. In some embodiments, the memory unit 110 may include a preloaded profile model 112 of the work-piece. In some embodiments, the preloaded profile model may be a profile CAD model of an entire work pieces. For example, the preloaded profile model may be a CAD model of a hood, a fender, a door, pillars of a vehicle. The memory unit 110 may include a plurality of preloaded profile models. An operator may select a preloaded profile models via a user interface 114.

The processor 108 may receive the converted data on the work-pieces or a scanned image from the scanner 102 and determine the join positions on the pieces according to the scanned image. In some embodiments, the processor 108 may overlay the scanned image with preloaded profile model to determine the join position on the pieces. It should be appreciated that any appropriate method may be used to determine the join position.

The processor 108 may communicate with the guide device 106 to execute a program to provide a guidance in placing a tip of the joining machine on the work-pieces. In some embodiments, the guide device 106 may be a light projector. The light projection from the light projector may be controlled by the program. In other words, the positioning device 104 may control when and where the light is projected on the work-pieces. For example, once a join position is determined, the positioning device 104 may command or instruct the light projector to project the light on the join position. While the operator is moving the joining machine, the scanner 102 keeps scanning the work-pieces so that the positioning device 104 can adjust an angle that the light beam is projected to the pieces based on the scanned images. In this way, the light beam is always directed to the join position despite the movement of the joining machine.

In some embodiments, the guide device 106 may be a display device. The positioning device 104 may process the information from the scanner 102 and cause the display of both the image of the tip of the joining machine and the join position a display screen of the display device. The operator can locate the join position according to the images shown on the display screen.

The memory unit 110 may further include a quality control database 116. In some embodiments, the scanner 102 may capture the actual join positions on the work-pieces joined by the joining machine. The positioning device 104 may receive and record the actual join positions, and store the data of the actual join positions along with the corresponding join positions determined by the positioning device 104 in the quality control database 116. The data in the quality control database 116 may be retrieved to evaluate the quality of the product and performance of the operator in the quality control process.

The position guide system 100 may further include a confirmation device 118 to confirm that the tip of joining machine is at a correct position on the work-pieces. When the positioning device 104 determines that the tip of the joining machine is on the join position, it may cause the confirmation device 118 to send confirmation to the operator. In some embodiments, the confirmation device 114 may be an audio unit that makes a sound confirmation by issuing a verbal statement or simply generating a sound when the tip of the joining machine is substantially located on the join position. In some embodiments, the confirmation device 114 may be a lamp that turns on green light. Any appropriate method may be used to confirm the join position once the tip of the joining machine is placed substantially on the join position.

Figure 3A:
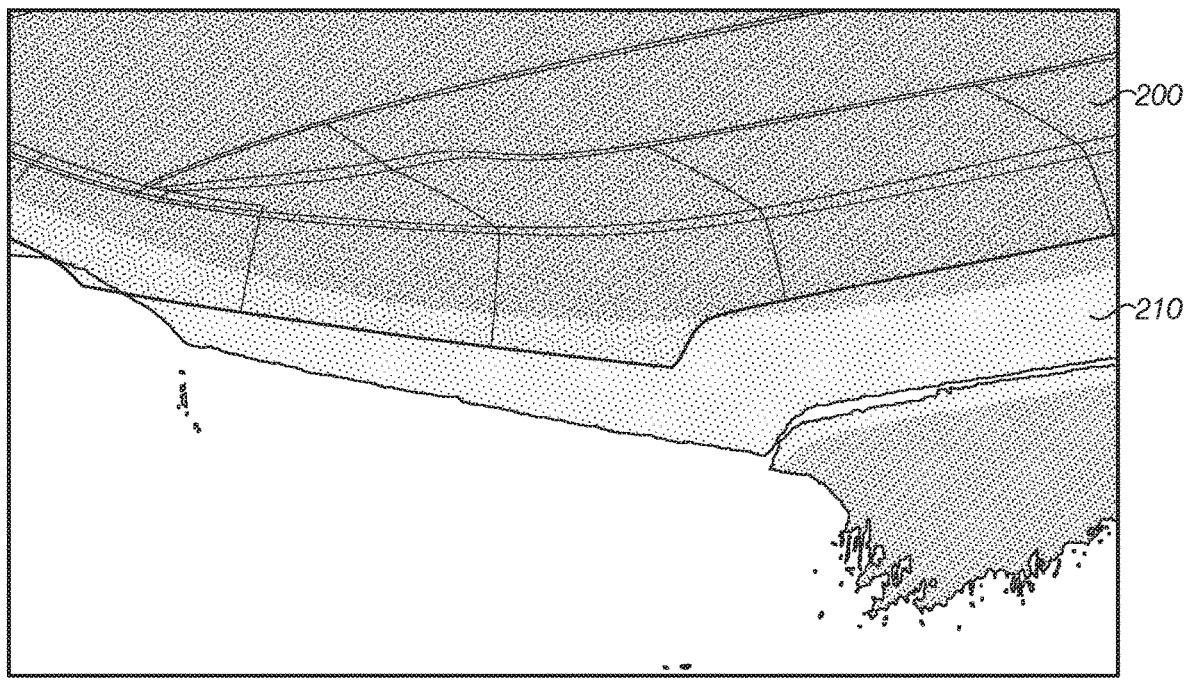
FIGS. 3A and 3B illustrate a process of determining a join position and indicating the join position by an example position guide system in a joining machine.
Figure 3B:
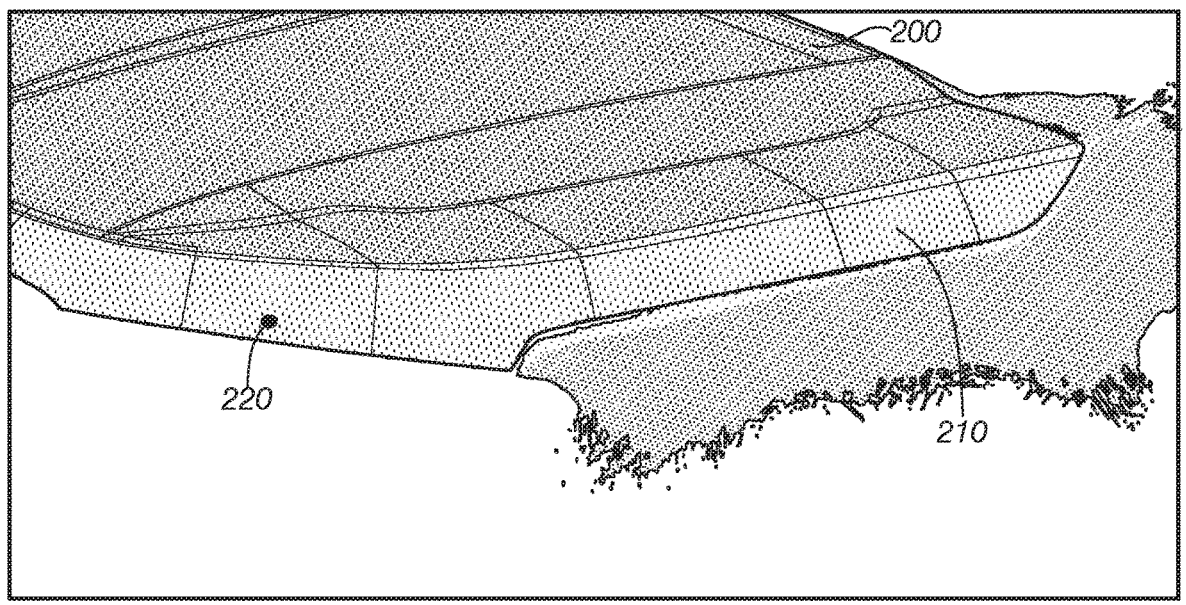

Now turning to FIGS. 3A and 3B, a process of determining a join position and indicating the join position by an example position guide system in a joining machine is illustrated. FIGS. 3A and 3B schematically show a scanned image 210 and a preloaded profile model 200 which are processed in the position guide system. The position guide system may include at least one scanner, a positioning device and a guide device. The scanned image 210 is generated by the scanner according to data collected from the work-pieces to be joined. In the illustrated example, the scanned image is a 3D image. The preloaded profile model 200 is generated from data stored in the positioning device of the position guide system and is a CAD model in the illustrated example. In the example shown in FIGS. 3A and 3B, the work-pieces to be joined include a hood of a vehicle.

As the joining machine is moved close to the work-pieces, the scanner starts scanning and transmits the scanned image 210 to the positioning device. In the illustrated example in FIG. 3A, the scanned image 210 overlays the preloaded profile model 200. When the joining machine is moved further, the scanned image 210 gets to be aligned with the preloaded profile model 200 as shown in 3B. When the scanned image 210 is aligned with the preloaded profile model 200, a join position 220 is determined. In the illustrated example, the guide device is a light projector. A light is projected on the join position 220 as a red dot on a surface of the piece. In some embodiments, one light point will be projected at one time. When an operator completes the joining process at the join position and a tip of the joining machine is moved away from the join position, the scanner keeps scanning the work-pieces and the position guide system determines next join position according to the scanned image 210 and the preloaded profile model 200, and projects a light on the next join position. The process continues until all designated joints are joined and the connection process on the whole work-pieces process is completed.

Figure 4A:
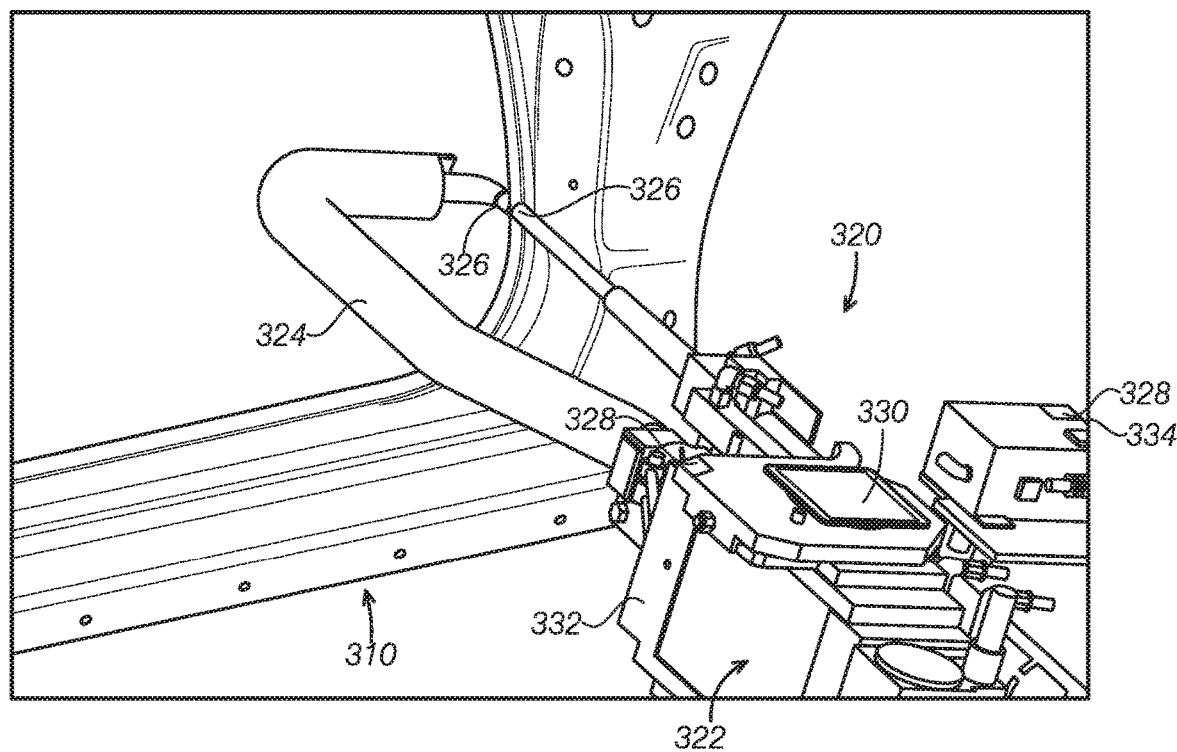
FIGS. 4A and 4B schematically illustrate another example joining machine according to one embodiment of the present disclosure.
Figure 4B:
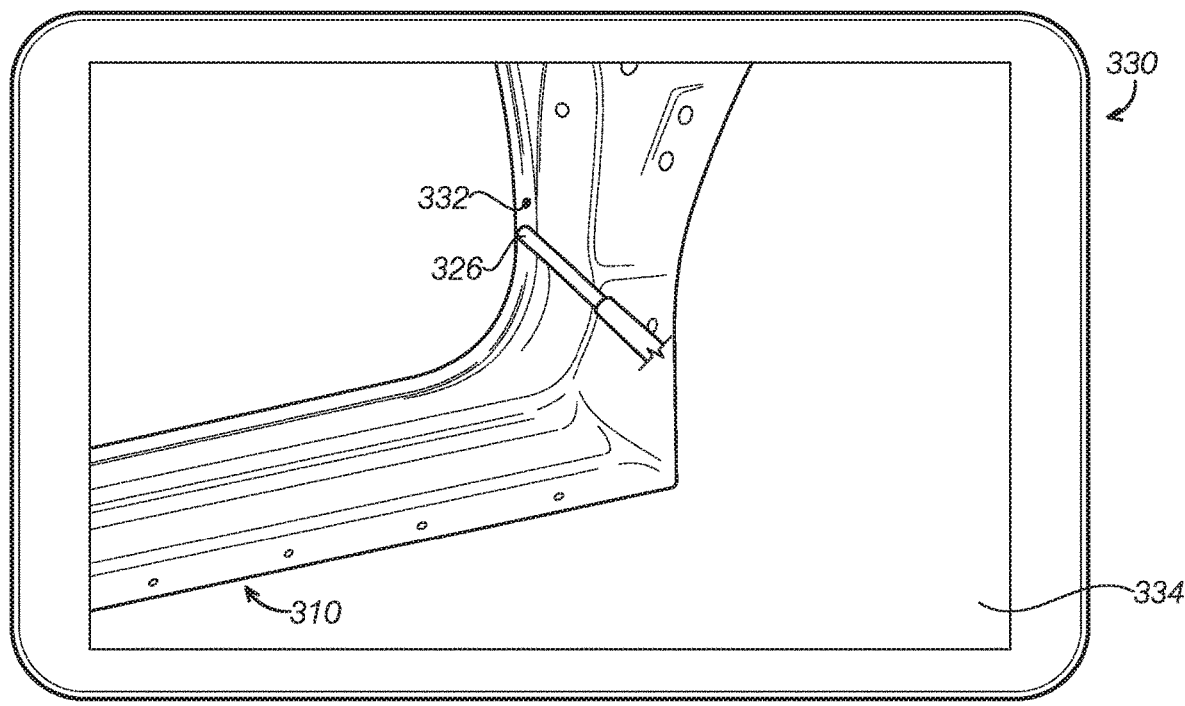

Now turning to FIGS. 4A, and 4B, another example embodiment of a joining machine having a position guide system is illustrated. FIG. 4A is a schematic view of a work-piece 310 and an example spot welding gun 320. FIG. 4B is a display of a join position in a guide device 330. It should be appreciated that the spot welding gun 320 is an example joining machine that join pieces together at a plurality of join points or join positions. Hereinafter, the descriptions to the same elements as in the embodiments illustrated in FIG. 1 will be omitted or mentioned briefly for the sake of brevity. In other words, differences between the present embodiment and the embodiment of FIG. 1 will be mainly described.

In some embodiments, the spot welding gun 320 may include a body 322, an arm 324 and a tip 326. In some embodiments, the spot welding gun 320 may involve resistance spot welding and the tips 326 include electrodes. As illustrated in FIG. 4A, the work-piece 310 and another piece (not shown) to be joined with the work-piece 310 are held between two electrodes 326 and compressed under pressure.

The position guide system of the spot welding gun 320 may include a first scanner 328 disposed on or adjacent to a first side 332 of the body 322 and a second scanner disposed on or adjacent to a second side 334 of the body 322. As an operator moves the spot welding gun 320 to the work-piece 310, the scanner 328 collects information on a surface of the work-piece 310 and generate a scanned image. As described above with reference to FIGS. 1-3, the position guide system may determine the join position according to the scanned image and the preloaded profile model. The join position may be indicated by the guide device 330. In the depicted embodiment, the guide device 330 is a display device. In the depicted embodiment, the display device 330 may be disposed on the body 322 of the spot welding gun 320. In some embodiments, the display device 330 may be rotatably attached to the body 322 so that the display device 330 may be folded at a stowed position and deployed for the operator's view at a use position.

Now referring to FIG. 4B, the join position 332 is shown in the display screen 334 of the display device 330 as the spot welding gun 320 approaches the work-piece 310 at a predetermined distance. Further, the tip 326 of spot welding gun 320 is shown in the display screen 334. The operator can monitor the display screen 334 and move the tip 326 until the tip 326 is placed near or at the join position 332. Once the welding at join position 332 is completed, the operator may move the spot welding gun 320 toward next join position. An image of the tip 326 appears on the display screen 334 again to assist the operator to locate the next join position. The process repeats until all the designated joint points are joined by the spot welding gun 320.

Figure 5:
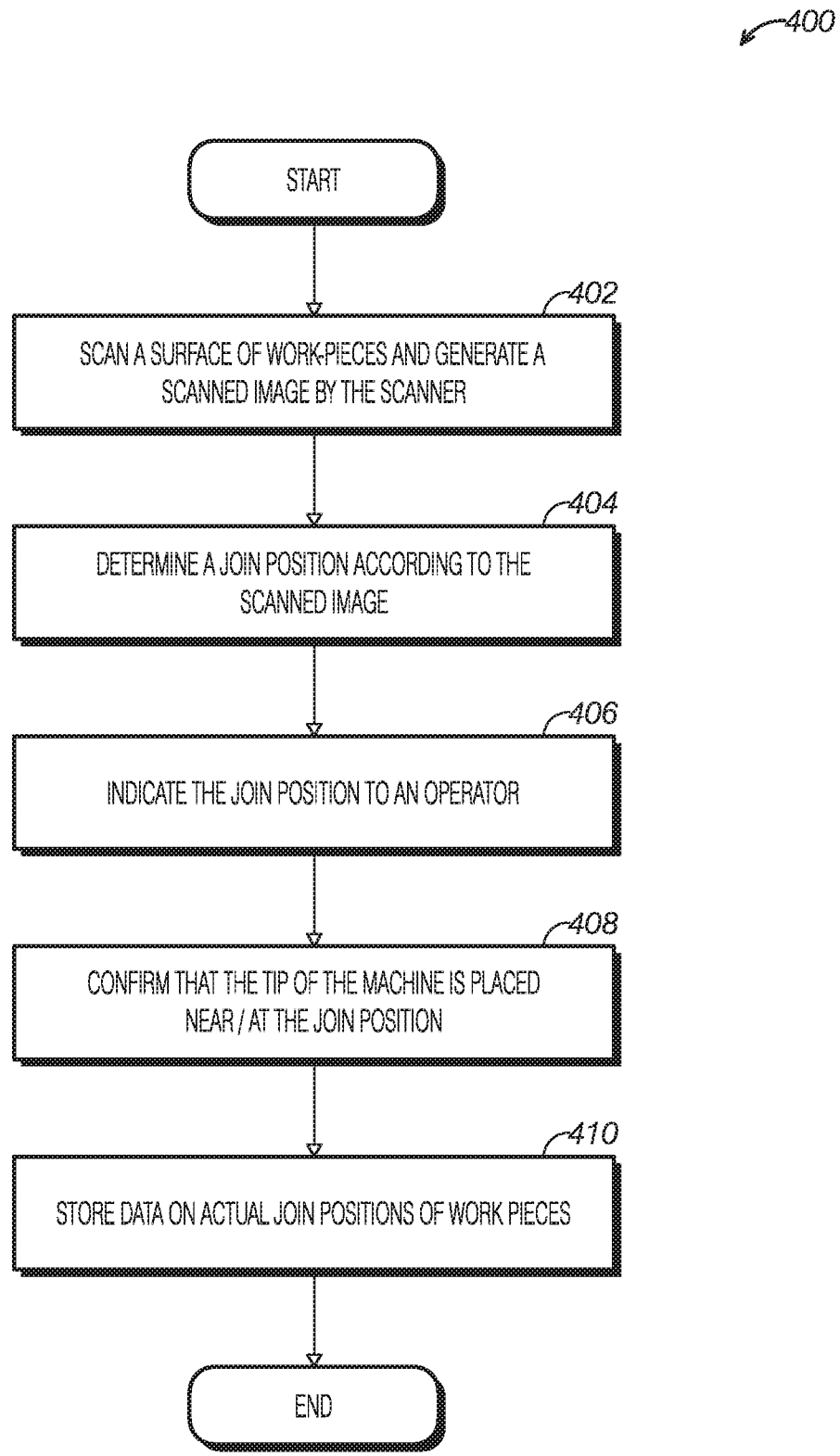
FIG. 5 is a flow chart of a method to positioning a joining machine according to an example embodiment of the present disclosure.

Now turning to FIG. 5, a flowchart is shown to illustrate a method 400 of joining pieces manually using a joining machine. As described above, the joining machine may include a scanner, a guiding device, and a positioning device. A method 400 is used to guide an operator to join work-pieces using the joining machine. At 402, method 400 includes scanning a surface of work-piece to be joined and generating a scanned image by the scanner. As described above, the scanner may be a 3D scanner or any suitable scanner that generates a scanned image of the work-piece. At 404, method 400 includes determining a join position according to the scanned image. In some embodiments, determining the join position includes comparing the scanned image to a preloaded CAD model of the work-pieces. For example, the scanned image may be overlaid with preloaded CAD model as a tip of the joining machine approaches the work-pieces. When the scanned image is aligned with the preloaded profile model, the join position can be determined.

Next, at 406, method 400 include indicating the join position to the operator so as to guide the operator to place a tip of the joining machine. In some embodiments, the guide device is a light projector disposed on the joining machine. Indicating the join position includes projecting a light point to the surface of the work-piece. As the scanner keeps scanning the piece, the method knows the position of a light source in the light projector relative to the join position and direct the light to the join position while the operator is moving the joining machine. The light point projected on the piece can guide the operator to place the tip of the joining machine at the join position correctly. In some embodiments, the guiding device is a display device disposed on the machine. Indicating the join position includes displaying the join position and a tip of the joining machine on a display screen. The operator can watch the movement of the tip on the display screen and place the tip on the join position.

Additionally or alternatively, at 408, method 400 may include confirming that the tip of the machine is placed at the join position. In some embodiment, confirmation may be made by issuing a verbal statement or a sound. In some embodiments, confirmation may be made by turning on a green light on a body of the joining machine.

Additionally or alternatively, at 410, method 400 may include storing data of actual join positions of the work-piece and the preset join positions for quality control. By comparing the actual join positions of the work-piece and the join positions, it is possible to determine if the joined work-pieces meet the standard and if there are defects on the joined work-piece. The data can be used in quality control process.

The disclosure above encompasses multiple distinct inventions with independent utility. While each of these inventions has been disclosed in a particular form, the specific embodiments disclosed and illustrated above are not to be considered in a limiting sense as numerous variations are possible. The subject matter of the inventions includes all novel and non-obvious combinations and subcombinations of the various elements, features, functions and/or properties disclosed above and inherent to those skilled in the art pertaining to such inventions. Where the disclosure or subsequently filed claims recite "a" element, "a first" element, or any such equivalent term, the disclosure or claims should be understood to incorporate one or more such elements, neither requiring nor excluding two or more such elements.

Applicant(s) reserves the right to submit claims directed to combinations and subcombinations of the disclosed inventions that are believed to be novel and non-obvious. Inventions embodied in other combinations and subcombinations of features, functions, elements and/or properties may be claimed through amendment of those claims or presentation of new claims in the present application or in a related application. Such amended or new claims, whether they are directed to the same invention or a different invention and whether they are different, broader, narrower or equal in scope to the original claims, are to be considered within the subject matter of the inventions described herein.

The invention claimed is:

1. A joining machine to join work-pieces together, comprising:
    a body;
    at least one scanner disposed on the body and configured to collect data on the work-pieces and convert the data to a scanned image;
    a guide device; and
    a positioning device, wherein the positioning device is configured to determine a join position according to the scanned image and instruct the guide device to indicate the join position on the work-pieces to an operator of the joining machine;
    wherein the positioning device is further configured to include a preloaded profile model of the work-pieces and determine the join position by comparing the scanned image with the preloaded profile model, and
    wherein the positioning device is further configured to determine the loin position by overlaying the scanned image with the preloaded profile model.

2. The joining machine of claim 1, wherein the at least one scanner is a 3D scanner and the scanned image is a 3D image, and wherein the preloaded profile model is a CAD model.

3. The joining machine of claim 1, further comprising a tip, wherein the tip is coupled to the body and configured to apply a force to the work-pieces, wherein the guiding device is a light projector, and wherein a light is projected to the work-pieces to indicate the join position when the tip approaches to the work-pieces at a first predetermined distance.

4. The joining machine of claim 3, wherein the light projected is a laser or a visible light, and wherein a green light is turned on when the tip is placed substantially at the join position.

5. The joining machine of claim 3, wherein the light projector is configured to stop projecting the light on the work-pieces when the tip is moved within a second predetermined distance to the work-pieces, and the second predetermined distance is less than the first predetermined distance.

6. The joining machine of claim 1, further comprising a tip, wherein the tip is coupled to the body and configured to apply a force to the work-pieces, and wherein the guide device includes a display screen attached to the body and the join position is indicated on the display screen to guide the operator in placing the tip on the work-pieces.

7. The joining machine of claim 1, wherein the positioning device is configured to store data of actual join position at which the work-pieces are joined by a force along with corresponding data in the preloaded profile model for quality control.

8. The joining machine of claim 1, wherein the joining machine is a spot welding gun.

9. The joining machine of claim 1, wherein the joining machine is a self-piece riveting gun, a self-pierce screw gun, a self-pierce bolt gun, or an adhesive gun.

10. A joining machine to join work-pieces at a join position and to be held by an operator, comprising:
   a tip to apply a force to the work-pieces;
   a body including a first side and a second side;
   a first 3D scanner disposed adjacent to the first side of the body, wherein the first 3D scanner is configured to collect first data on a surface of the work-pieces and convert the first data into a first scanned CAD image;
   a second 3D scanner disposed adjacent to the second side opposite the first side, wherein the second 3D scanner is configured to collect second data on the surface of the work-pieces and convert the second data into a second scanned CAD image;
   a guide device disposed on the body and configured to indicate the join position on the work-pieces to the operator of the joining machine; and
   a positioning device configured to determine the join position according to the first scanned CAD image and the second scanned CAD image, and command the guide device to show the join position to the operator;
   wherein the join position is determined by comparing the first scanned CAD image and the second scanned CAD image with a preloaded CAD model of the work-pieces.

11. The joining machine of claim 10, wherein the guiding device is a light projector that projects a light on the join position when the scanned CAD image is aligned with the preloaded CAD model.

12. The joining machine of claim 10, wherein the guide device includes a display screen, and the join position and the tip are shown on the display screen to guide the operator place the tip to the join position.

13. A joining machine to join work-pieces at a join position and to be held by an operator, comprising:
   a tip to apply a force to the work-pieces;
   a body including a first side and a second side;
   a first 3D scanner disposed on the first side of the body, wherein the first 3D scanner is configured to collect first data on a surface of the work-pieces and convert the first data into a first scanned CAD image;
   a second 3D scanner disposed on the second side opposite the first side, wherein the second 3D scanner is configured to collect second data on the surface of the work-pieces and convert the second data into a second scanned CAD image;
   a guide device disposed on the body and configured to indicate the join position on the work-pieces to the operator of the joining machine; and
   a positioning device configured to determine the join position according to the first scanned CAD image and the second scanned CAD image, and command the guide device to show the join position to the operator;
   wherein the join position is determined by comparing the first scanned CAD image and the second scanned CAD image with a preloaded CAD model of the work-pieces.

14. The joining machine of claim 13, wherein the guiding device is a light projector that projects a light on the join position when the scanned CAD image is aligned with the preloaded CAD model.

15. The joining machine of claim 13 wherein the guide device includes a display screen, and the join position and the tip are shown on the display screen to guide the operator place the tip to the join position.

* * * * *